US006658923B2

(12) United States Patent
Fabre

(10) Patent No.: US 6,658,923 B2
(45) Date of Patent: Dec. 9, 2003

(54) LEAK DETECTION A VAPOR HANDLING SYSTEM

(75) Inventor: Laurent Fabre, Portet sur Garonne (FR)

(73) Assignee: Siemens Automotive S.A., Toulouse (FR)

( * ) Notice: Subject to any disclaimer, the term of this patent is extended or adjusted under 35 U.S.C. 154(b) by 114 days.

(21) Appl. No.: 09/790,167

(22) Filed: Feb. 21, 2001

(65) Prior Publication Data

US 2001/0029933 A1 Oct. 18, 2001

Related U.S. Application Data

(60) Provisional application No. 60/184,193, filed on Feb. 22, 2000.

(51) Int. Cl.[7] ........ G01M 15/00

(52) U.S. Cl. ........ 73/118.1

(58) Field of Search ........ 73/40, 40.5, 47, 73/49.2, 117.3, 118.1, 49.7, 40.7; 123/198 D, 516–520

(56) References Cited

U.S. PATENT DOCUMENTS

| | | | | |
|---|---|---|---|---|
| 5,143,035 A | | 9/1992 | Kayanuma | 123/198 |
| 5,263,462 A | | 11/1993 | Reddy | 123/520 |
| 5,295,472 A | | 3/1994 | Otsuka et al. | 123/520 |
| 5,398,661 A | | 3/1995 | Denz et al. | 123/520 |
| 5,490,414 A | | 2/1996 | Durschmidt et al. | 73/49.2 |
| 5,635,630 A | * | 6/1997 | Dawson et al. | 73/40.5 |
| 5,744,701 A | | 4/1998 | Peterson et al. | 73/49.2 |
| 5,750,888 A | | 5/1998 | Matsumoto et al. | 73/118.1 |
| 5,868,120 A | * | 2/1999 | Van Wetten et al. | 123/518 |
| 5,957,115 A | * | 9/1999 | Busato et al. | 123/520 |
| 5,964,812 A | * | 10/1999 | Schumacher et al. | 701/31 |
| 5,967,124 A | | 10/1999 | Cook et al. | 123/520 |
| 5,988,206 A | | 11/1999 | Bare et al. | 137/354 |
| 6,073,487 A | | 6/2000 | Dawson | 73/118.1 |
| 6,089,081 A | | 7/2000 | Cook et al. | 73/118.1 |
| 6,158,270 A | | 12/2000 | Garman et al. | 73/40.7 |
| 6,164,123 A | | 12/2000 | Corkill | 73/49.7 |
| 6,182,642 B1 | | 2/2001 | Ohkuma | 123/520 |
| 6,283,098 B1 | * | 9/2001 | Corkill | 123/520 |

FOREIGN PATENT DOCUMENTS

| | | |
|---|---|---|
| EP | 0 598 176 | 3/1994 |
| EP | 0 611 674 | 8/1994 |
| EP | 0 952 332 | 10/1999 |
| FR | 2 732 072 | 9/1996 |
| WO | WO 99/18419 | 4/1999 |
| WO | WO 99/37905 | 7/1999 |

* cited by examiner

*Primary Examiner*—Kamand Cuneo
*Assistant Examiner*—Monica D. Harrison

(57) ABSTRACT

A method of leak detection in a closed vapor handling system of an automotive vehicle while an engine is running, implemented by a system, the method including providing a pressure sensing element that obtains at least one pressure signal, closing a control valve and a shut off valve to seal the system from the engine and an atmosphere, generating a vacuum by opening the control valve, analyzing the at least one pressure signal at threshold times, comparing the at least one pressure signal to at least one pressure control value, and determining a leak condition if the at least one pressure signal is not less than the at least one pressure control value. The system including a pressure sensing element, a control valve, a shut off valve, a processor operatively coupled to the pressure sensing element and the shut off valve and receiving pressure signals from the pressure sensing element and sending signals to the control valve and the shut off valve. The processor closes the control valve and the shut off valve, generates a vacuum, depressurizes the system using the vacuum, controls the vacuum by opening the control valve, analyzes the pressure signal at threshold times, compares the pressure signal to pressure control values, and determines a leak condition.

27 Claims, 2 Drawing Sheets

LEAK DETECTION A VAPOR HANDLING SYSTEM

REFERENCE TO RELATED APPLICATION

This application expressly claims the benefit of the earlier filing date and right of priority from the following patent application: U.S. Provisional Application Ser. No. 60/184,193, filed on Feb. 22, 2000 in the name of Laurent Fabre and Pierre Calvairac and entitled "Vacuum Detection." The entirety of that earlier filed co-pending provisional patent application is expressly incorporated herein by reference.

FIELD OF INVENTION

This invention relates to leak detection methods and systems, and more particularly, to automotive fuel leak detection in a vapor handling system.

BACKGROUND OF INVENTION

In a vapor handling system for an automotive vehicle, fuel vapor that escapes from a fuel tank is stored in a canister. If there is a leak in the fuel tank, the canister, or any other component of the vapor handling system, fuel vapor could exit through the leak to escape into the atmosphere.

SUMMARY OF THE INVENTION

The present invention provides a method of leak detection in a closed vapor handling system of an automotive vehicle while an engine is running. This method includes providing a pressure sensing element that obtains at least one pressure signal, closing a control valve and a shut off valve to seal the system from the engine and an atmosphere, generating a vacuum by opening the control valve, analyzing the at least one pressure signal at threshold times, comparing the at least one pressure signal to at least one pressure control value, and determining a leak condition if the at least one pressure signal is not less than the at least one pressure control value.

The present invention also provides another method of leak detection in a closed vapor handling system of an automotive vehicle while an engine is running. The method includes providing differential tank pressure sensor that provides pressure, closing a canister purge control valve to seal the system from the engine and an atmosphere, waiting for a first period of time, closing a shut off valve, waiting for a second period of time, determining a pressure sensor offset, estimating a correction value for vapor generation, aborting the leak detection if the correction value is greater than a control correction value, calculating a pressure mean value, dropping the pressure to a first threshold pressure by opening the control valve for a third period of time, detecting a tank cap missing condition if a second threshold pressure is not reached within a third period of time, detecting a large leak condition if the pressure drops below the second threshold pressure and above the first threshold pressure within the third period of time, aborting the leak detection if the speed of the automotive vehicle is greater than zero, ending the leak detection if a fuel volume is not within a control volume range, evaluating a pressure slope over a fourth period of time, calculating a corrected pressure slope using the correction value for vapor generation, and determining a leak diameter by comparing the corrected pressure slope to pressure control values within threshold times.

The present invention also provides an automotive evaporative leak detection system. The system includes a pressure sensing element, a control valve, a shut off valve, a processor operatively coupled to the pressure sensing element and the shut off valve and receiving pressure signals from the pressure sensing element and sending signals to the control valve and the shut off valve. The processor closes the control valve and the shut off valve, generates a vacuum, depressurizes the system using the vacuum, controls the vacuum by opening the control valve, analyzes the pressure signal at threshold times, compares the pressure signal to pressure control values, and determines a leak condition.

The present invention further provides another automotive evaporative leak detection system. This system includes a differential tank pressure sensor located on a conduit between a fuel tank and a canister, the canister communicating with an engine and an atmosphere, the fuel tank communicating with the engine, a shut off valve located between the canister and the atmosphere, a control valve located between the canister and the engine, and a processor operatively coupled to the pressure sensing element and the shut off valve and receiving pressure signals from the pressure sensing element and sending signals to the control valve and the shut off valve. The processor closes the control valve, waits for a period of time, closes a shut off valve, determines a pressure sensor offset, estimates a correction value for vapor generation, calculates a pressure mean value, drops the pressure to a threshold pressure, detects a tank cap missing condition, detects a large leak condition, aborts the diagnosis, evaluates a pressure slope, calculates a corrected pressure slope, and determines a leak diameter by comparing the corrected pressure slope to pressure control values within threshold times.

BRIEF DESCRIPTION OF THE DRAWINGS

The accompanying drawings, which are incorporated herein and constitute part of this specification, illustrate the presently preferred embodiment of the invention, and, together with the general description given above and the detailed description given below, serve to explain the features of the invention.

DETAILED DESCRIPTION OF THE PREFERRED EMBODIMENT

Reference will now be made in detail to the preferred embodiments of the present invention, examples of which are illustrated in the accompanying drawings. It is to be understood that the Figures and descriptions of the present invention included herein illustrate and describe elements that are of particular relevance to the present invention, while eliminating, for purposes of clarity, other elements found in typical automotive vehicles and vapor handling systems.

Figure 1:
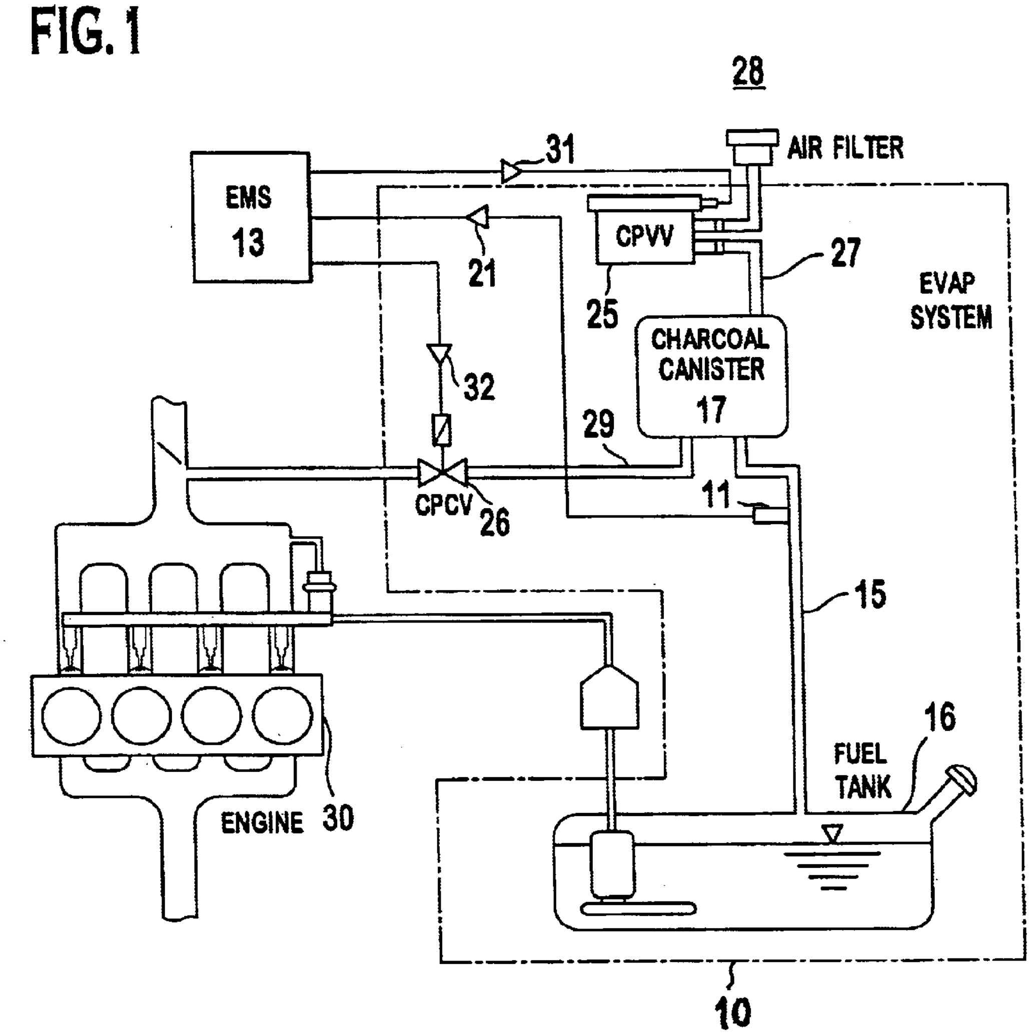
FIG. 1 is a schematic view of a preferred embodiment of the system of the present invention.

As shown in FIG. 1, an evaporative leak detection system 10 in an automotive vehicle includes a pressure sensing element 11, a shut off valve 25, a control valve 26, and a processor 13. Preferably, the pressure sensing element 11 is in fluid communication with vapor in a fuel tank 16. In the preferred embodiment, the pressure sensing element 11 is a differential tank pressure sensor (DTP) located on a conduit 15 between the fuel tank 16 and a canister 17. The differential tank pressure sensor provides a pressure with the system 10 in comparison to an atmosphere 28. The pressure sensing element 11 may also be a switch that moves at a given relative vacuum, or pressure control value, or a pair of switches that move at different relative vacuums, or pressure control values, having a high vacuum threshold for large leak detection of about 1 mm.

The shut off valve 25, or preferably, a canister purge vent valve, is located on a conduit 27 between the canister 17 and the atmosphere 28. The shut off valve 25 is normally open. Closing the shut off valve 26 hermetically seals the system 10 from the atmosphere 28. The control valve 26, or preferably, a canister purge control valve, is located on a conduit 29 between the canister 17 and an engine 30. The engine 30 communicates with the fuel tank 16 and the canister 17. Closing the control valve 26 seals the system 10 from the engine 30.

The processor 13, or engine management system, is operatively coupled to, or in communication with, the pressure sensing element 11, the shut off valve 25 and the control valve 26. The processor 13 receives and processes pressure signals 21 from the pressure sensing element 11 and sends signals 31 and 32, respectively, to open and close the valves 25 and 26, respectively. The processor 13 can either include the necessary memory or clock or be coupled to suitable circuits that implement the communication. The processor 13 also waits for a period of time, determines a pressure sensor offset, estimates a correction value for vapor generation, calculates a pressure mean value, drops the pressure to a threshold pressure, detects a tank cap missing condition, detects a large leak condition, aborts the diagnosis, evaluates a pressure slope, calculates a corrected pressure slope, and determines a leak diameter by comparing the corrected pressure slope to pressure control values within threshold times.

Figure 2:
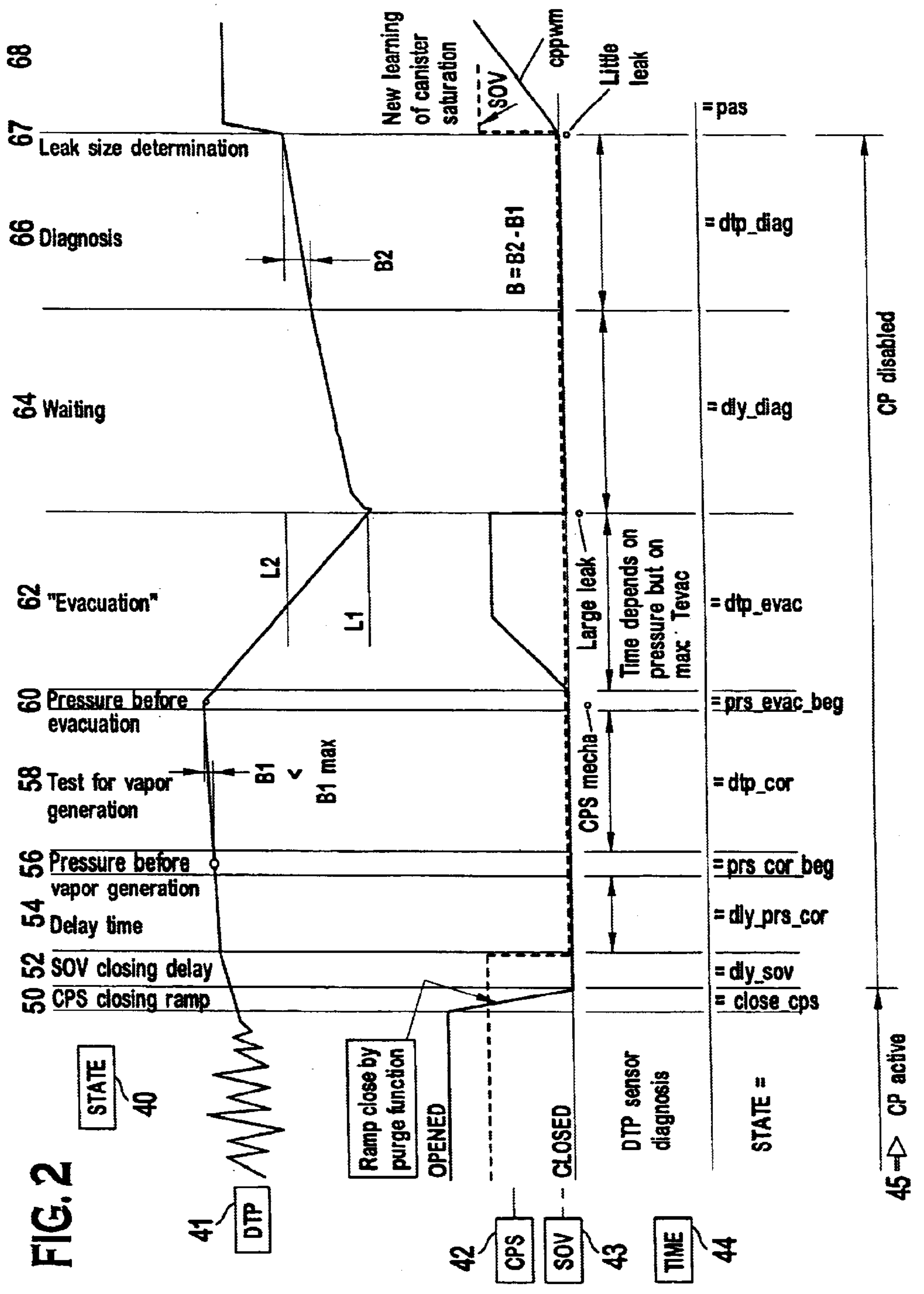
FIG. 2 is a graphic illustration of the preferred embodiment of the method of the present invention.

The system 10 implements a method of leak detection, or leak detection diagnosis, when an automotive vehicle is running. The method is based on vacuum detection and is particularly useful for leak detection during Federal Test Procedure cycles. The method includes leak detection and monitoring for malfunction of components in the system. FIG. 2 illustrates the preferred embodiment of the method by defining the steps by state 40 and showing the DTP value 41, the control valve and shut off valve status, 42 and 43, respectively, whether time 44 is involved and whether the canister purge function 45 is active during the steps. The control valve 26 is closed in step 50 to seal the system 10 from the engine 30 and the atmosphere 28. After a delay of a first period of time, the shut off valve 25 is closed, in step 52, to generate a vacuum. After a delay of a second period of time in step 54, the pressure sensor offset is determined in step 56. To get a reliable monitoring result, the actual sensor offset is necessary to correct the pressure signal. In step 58, the fuel vapor generation is estimated. The output, B1, corresponds to a pressure correction value, which considers the increase of pressure due to unsaturated hydrocarbon vapor. Information about fuel volume may be necessary to determine the pressure correction value. If the vapor generation during steps 58 is too high, where the correction value, B1, is greater than a control correction value, B1 max, the diagnosis may be aborted because excessive evaporation may result in an inaccurate diagnosis. A pressure mean value is then calculated in step 60. If, however, there is a differential pressure decrease during step 58 due to environmental conditions, there may be a delay until a differential pressure increase.

In step 62, specified as an evacuation step, a vacuum is created where the pressure is dropped to a first threshold pressure, L1. The system 10 uses the manifold vacuum by means of the control valve 26 to depressurize the system 10. If the pressure does not reach a second threshold pressure, L2, which is less than L1, within a period of time, the system 10 detects that the tank cap is missing. If the pressure drops below L2, but does not reach L1, then a large leak is detected. If the speed of the automotive vehicle is greater than zero (0), the leak detection diagnosis will be aborted, or ended. In addition, in step 64, if a fuel volume is not within a control volume range, the diagnosis is aborted because the system 10 is not properly sealed. If the diagnosis is aborted at any time, after a delay time, if all diagnosis conditions exist, or the system 10 stabilizes, the diagnosis may restart at step 56.

Over a period of time, in step 66, the pressure slope, B2, is evaluated. The corrected pressure slope B, may then be calculated using the correction value for vapor generation in the equation, B=B2−B1. The corrected pressure slope corresponds to the leak magnitude, where a physical relationship exists between B and the leak diameter. The leak diameter may be determined in step 67 by comparing the corrected pressure slope to pressure control values within threshold times, where a leak is determined if the pressure is greater than or equal to the pressure control value. A small leak of about 0.5 millimeter or a large leak of about 1 millimeter may be detected. A no leak detection may also be determined if a pressure is less than the pressure control value. The shut off valve 25 and control valve 26 may then be opened in step 68 and the signals provided by the pressure sensor 11 may become constant.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What we claim is:

1. A method of leak detection in a closed vapor handling system of an automotive vehicle while an engine is running comprising:

providing a pressure sensing element that obtains at least one pressure signal;

closing a control valve and a shut off valve to seal the system from the engine and an atmosphere;

generating a vacuum by opening the control valve;

analyzing the at least one pressure signal at threshold times;

determining a source of leak condition from a plurality of source of leak conditions if the at least one pressure signal is not less than the at least one pressure control value;

wherein the plurality of source of leak conditions include a tank cap missing condition, a large leak condition, and a leak diameter.

2. The method of claim 1 further comprising:

monitoring for malfunction of a component in the system.

3. The method of claim 1 wherein the providing comprises:

using a differential tank pressure sensor that supplies differential pressure between a pressure in the system and atmospheric pressure.

4. The method of claim 1 wherein the analyzing comprises:

computing a pressure differential between a first and second pressure signal.

5. The method of claim 1 wherein the providing comprises:

using a pressure switch that moves at the at least one pressure control value.

6. The method of claim 1 wherein the providing comprises:

using a pair of pressure switches that move at different pressure control values having a high vacuum threshold.

7. The method of claim 1 wherein the closing comprises:

providing a canister purge control valve.

8. The method of claim 1 wherein the closing comprises:

closing the control valve;

waiting for a first period of time;

closing the shut off valve; and waiting for a second period of time.

9. The method of claim 1 further comprising:

providing an engine management system to receive the at least one pressure signal from the pressure sensing element and send signals to the control valve and the shut off valve to open and close the valves.

10. The method of claim 1 wherein the determining comprises:

detecting a leak of about 1 millimeter.

11. The method of claim 1 further comprising:

determining a no leak condition if the at least one pressure signal is less than the at least one pressure control value.

12. The method of claim 1 wherein the analyzing comprises:

evaluating a pressure slope; and calculating a corrected pressure slope using a correction value for vapor generation.

13. The method of claim 12 wherein the comparing comprises:

comparing the corrected pressure slope to pressure control values within threshold times; and the determining comprises detecting a leak diameter based on the comparing.

14. The method of claim 1 wherein the generating comprises:

depressurizing the system using the vacuum; and controlling the vacuum by opening and closing the control valve.

15. The method of claim 1 further comprising:

determining a pressure sensor offset;

estimating a correction value for vapor generation;

aborting the leak detection if the correction value is greater than a control correction value;

calculating a pressure mean value;

dropping the pressure to a first threshold pressure by opening the control valve for a third period of time;

aborting the leak detection if the speed of the automotive vehicle is greater than zero; and ending the leak detection if a fuel volume is not within a control volume range;

wherein the determining comprises:

detecting a tank cap missing condition if a second threshold pressure is not reached within the third period of time; and detecting a large leak condition if the pressure drops between the second threshold pressure and the first threshold pressure within the third period of time.

16. The method of claim 1 wherein the comparing comprises:

evaluating whether the at least one pressure signal is greater than or equal to the pressure control value within a threshold time.

17. A method of leak detection in a closed vapor handling system of an automotive vehicle while an engine is running comprising:

providing differential tank pressure sensor that provides pressure;

closing a canister purge control valve to seal the system from the engine and an atmosphere;

waiting for a first period of time;

closing a shut off valve;

waiting for a second period of time;

determining a pressure sensor offset;

estimating a correction value for vapor generation;

aborting the leak detection if the correction value is greater than a control correction value;

calculating a pressure mean value;

dropping the pressure to a first threshold pressure by opening the control valve for a third period of time;

detecting a tank cap missing condition if a second threshold pressure is not reached within the third period of time;

detecting a large leak condition if the pressure drops between the second threshold pressure and the first threshold pressure within the third period of time;

aborting the leak detection if the speed of the automotive vehicle is greater than zero;

ending the leak detection if a fuel volume is not within a control volume range;

evaluating a pressure slope over a fourth period of time;

calculating a corrected pressure slope using the correction value for vapor generation; and determining a leak diameter by comparing the corrected pressure slope to pressure control values within threshold times.

18. An automotive evaporative leak detection system comprising:

a pressure sensing element;

a control valve;

a shut off valve;

a processor operatively coupled to the pressure sensing element, the control valve, and the shut off valve and receiving pressure signals from the pressure sensing element and sending signals to the control valve and the shut off valve;

wherein the processor closes the control valve and the shut off valve, generates a vacuum, analyzes the pressure signal at threshold times, compares the pressure signal to pressure control values, and determines a source of leak condition from a plurality of source of leak conditions;

wherein the plurality of source of leak conditions include a tank cap missing condition, a large leak condition, and a leak diameter.

19. The system of claim 18 wherein the pressure switch is in fluid communication with fuel tank vapor.

20. The system of claim 18 wherein the processor is in communication with the pressure sensing element.

21. The system of claim 18 wherein the pressure sensing element moves at a given relative vacuum.

22. The system of claim 18 wherein the pressure sensing element is located on a conduit between a fuel tank and a canister.

23. The system of claim 18 wherein the pressure sensing element comprises a pair of switches that move at different relative vacuums having a high vacuum threshold.

24. The system of claim 18 wherein the pressure sensing element comprises a differential tank pressure sensor located on a conduit between a fuel tank and a canister.

25. The system of claim 18 wherein the control valve comprises a canister purge control valve.

26. The system of claim 18 further comprising:

a fuel tank communicating with an engine; and a canister communicating with the fuel tank, the engine and an atmosphere, the pressure sensing element located between the fuel tank and the canister, the shut off valve located between the canister and the atmosphere, the control valve located between the canister and the engine.

27. An automotive evaporative leak detection system comprising:

a differential tank pressure sensor located on a conduit between a fuel tank and a canister, the canister communicating with an engine and an atmosphere, the fuel tank communicating with the engine;

a shut off valve located between the canister and the atmosphere;

a control valve located between the canister and the engine; and a processor operatively coupled to the differential tank pressure sensor and the shut off valve and receiving pressure signals from the differential tank pressure sensor and sending signals to the control valve and the shut off valve;

wherein the processor closes the control valve, waits for a period of time, closes a shut off valve, determines a pressure sensor offset, estimates a correction value for vapor generation, calculates a pressure mean value, drops the pressure to a threshold pressure, detects a tank cap missing condition, detects a large leak condition, aborts the diagnosis, evaluates a pressure slope, calculates a corrected pressure slope, and determines a leak diameter by comparing the corrected pressure slope to pressure control values within threshold times.

* * * * *